United States Patent
Gerwing et al.

(10) Patent No.: US 7,128,065 B2
(45) Date of Patent: Oct. 31, 2006

(54) METHOD AND DEVICE FOR CONTROLLING AN INTERNAL COMBUSTION ENGINE

(75) Inventors: Wolfram Gerwing, Hessigheim (DE); Stefan Forthmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 123 days.

(21) Appl. No.: 10/489,806

(22) PCT Filed: Jul. 25, 2002

(86) PCT No.: PCT/DE02/02732

§ 371 (c)(1),
(2), (4) Date: Sep. 1, 2004

(87) PCT Pub. No.: WO03/027471

PCT Pub. Date: Apr. 3, 2003

(65) Prior Publication Data

US 2005/0005922 A1    Jan. 13, 2005

(30) Foreign Application Priority Data

Sep. 20, 2001    (DE) ............................... 101 46 317

(51) Int. Cl.
    *F02D 41/14*    (2006.01)
(52) U.S. Cl. ............ 123/672; 123/681; 123/687; 123/698
(58) Field of Classification Search ............... 123/672, 123/681, 687, 698
See application file for complete search history.

(56) References Cited

U.S. PATENT DOCUMENTS

| | | | | |
|---|---|---|---|---|
| 3,990,411 A | * | 11/1976 | Oberstadt et al. | 123/687 |
| 5,856,922 A | * | 1/1999  | Jehanno | 701/108 |
| 6,622,691 B1 | * | 9/2003 | Bagnasco et al. | 123/698 |

FOREIGN PATENT DOCUMENTS

| | | |
|---|---|---|
| DE | 195 28 696 | 2/1997 |
| DE | 199 20 498 | 11/1999 |
| EP | 0 791 736  | 8/1997 |
| EP | 1 052 387  | 11/2000 |

* cited by examiner

Primary Examiner—Erick R Solis
(74) Attorney, Agent, or Firm—Kenyon & Kenyon

(57) ABSTRACT

A method and a device are described for controlling an internal combustion engine. On the basis of the comparison of a setpoint value with an actual value for a variable that characterizes the supplied oxygen quantity, an actuating variable is predefined for controlling an actuating element that influences the fuel quantity conducted to the internal combustion engine and/or the oxygen quantity supplied to the internal combustion engine. The actual value and/or the setpoint value are/is normalized to a reference value.

8 Claims, 3 Drawing Sheets

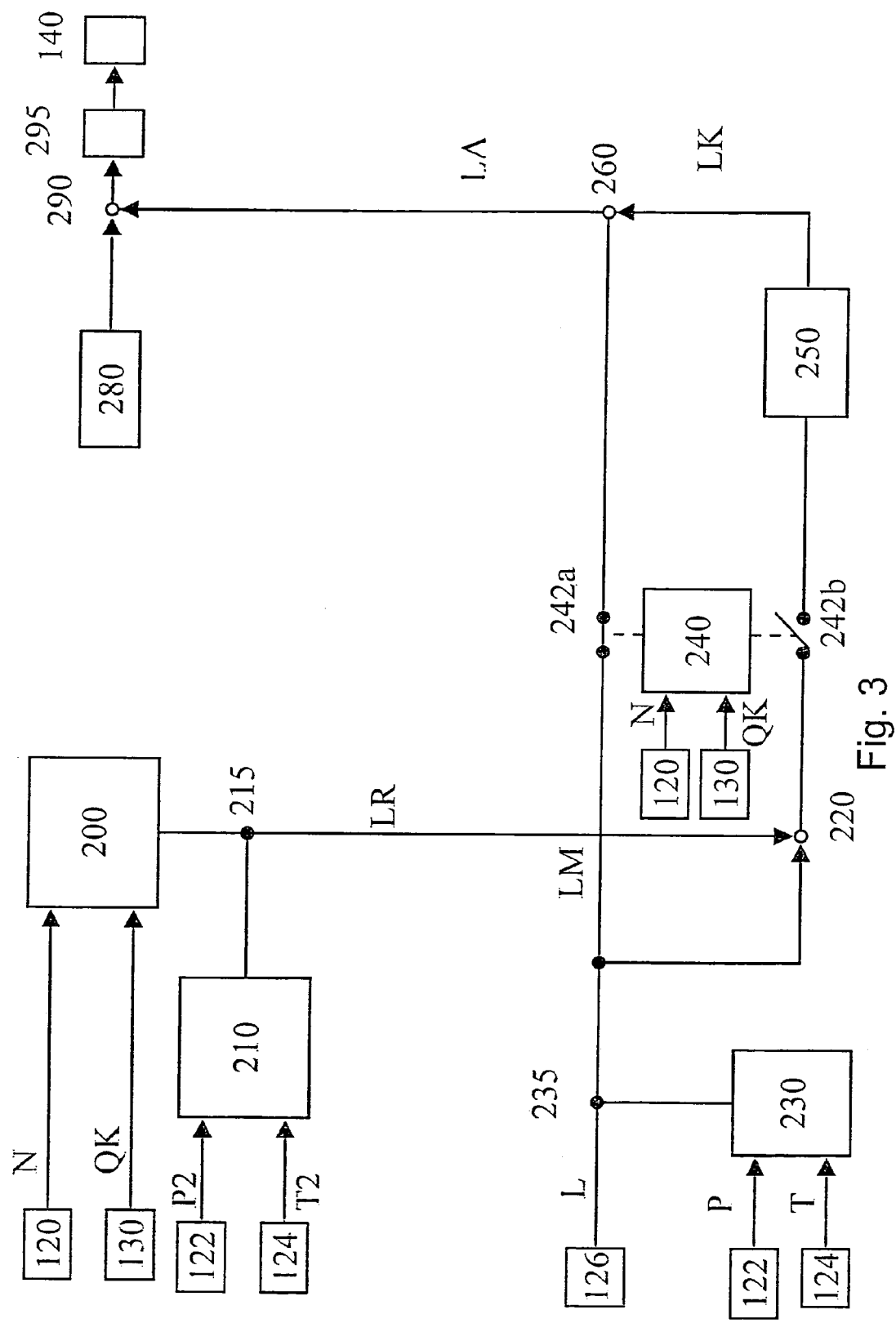

METHOD AND DEVICE FOR CONTROLLING AN INTERNAL COMBUSTION ENGINE

FIELD OF THE INVENTION

The present invention is directed to a method and a device for controlling an internal combustion engine.

BACKGROUND INFORMATION

German Published Patent Application No. 195 28 696 describes a method and a device for controlling an internal combustion engine, in which correction values are predefined on the basis of the deviation of the actually injected fuel quantity and the desired fuel quantity, the correction values being used to correct the fuel quantity to be injected. In the process, the injected fuel quantity is determined on the basis of a quantity that is measured by a lambda probe and which characterizes the oxygen concentration in the exhaust gas, and on the basis of the air quantity measured by a sensor.

Furthermore, German Published Patent Application No. 199 20 498 describes a method and a device for controlling the exhaust-gas recirculation, where the control signal is determined on the basis of an air mass difference.

Methods and devices for controlling an internal combustion engines are known in which an actuating variable is predefined on the basis of the comparison of a setpoint value with an actual value for a quantity that characterizes the supplied oxygen quantity in order to control an actuating element that influences the fuel quantity conducted to the internal combustion engine and/or the oxygen quantity supplied to the internal combustion engine. In particular, an actuating element is controlled that influences the portion of recirculated exhaust gas. As a rule, this control is implemented in such a way that the internal combustion engine is provided with the oxygen quantity that is necessary for an optimized combustion. The remaining gas quantity is filled up with waste gas.

Both methods according to the related art require a mass air-flow sensor, which is not available in all systems. Especially in the case of heavy goods vehicles, it is not provided for reasons of cost or because of the impreciseness in the measurement of the large air masses.

According to the present invention, the actual value and/or the setpoint value are normalized to a reference value. In the preferred exemplary embodiment this means that in certain operating states a correction value is determined on the basis of the deviation between a measured quantity and a reference value. Outside of the specific operating states, the measured quantity is appropriately corrected by this correction value.

Preferably used as reference value is the measured quantity that occurs in a reference internal combustion engine under corresponding conditions.

This means that in the specific operating states in which the measured quantity is detectable in a meaningful and/or reliable manner, the measured quantity is detected and compared to the reference value. On the basis of this comparison, the correction value is determined that indicates the deviation of the measured quantity from the reference value. The deviation of the particular internal combustion engine from the reference internal combustion engine is ascertained in the specific operating states. In the other operating states, the quantity that would result in the reference internal combustion engine is then determined with the aid of the correction value and the actual measured quantity. The quantity ascertained in this manner is used as the actual value for the closed-loop control circuit.

Depending on the specific embodiment, the oxygen concentration in the waste gas or the difference between the oxygen concentration with exhaust-gas recirculation and the oxygen concentration without exhaust-gas recirculation may be used directly as the actual quantity. Furthermore, an analogous procedure may be utilized in the regulation of another quantity that characterizes the oxygen quantity conducted to the internal combustion engine, such as the exhaust-recirculation rate, the air mass or the recirculated exhaust-gas quantity.

The actuating variable is preferably applied to an actuating element that influences the fuel quantity conducted to the internal combustion engine and/or the oxygen quantity supplied to the internal combustion engine. These are preferably actuating elements for influencing the recirculated exhaust-gas quantity.

It is particularly advantageous when the procedure is used in the case of a measured quantity that characterizes the oxygen concentration in the exhaust gas.

The specific operating states are preferably defined by at least the rotational speed and the injection quantity. Especially preferred are operating states in which no exhaust-gas recirculation takes place.

An especially precise control is obtained when the reference value and/or the measured quantity are/is corrected as a function of at least one temperature and/or one pressure variable. This makes it possible to compensate for influences caused by the temperature and air pressure.

Using the procedure of the present invention allows a regulation of the exhaust-gas recirculation rate, or of the fresh air quantity conducted to the internal combustion engine, thereby permitting a substantial reduction in the exhaust emission.

BRIEF DESCRIPTION OF THE DRAWINGS

FIG. 3 shows a second embodiment of the procedure according to the present invention.

DETAILED DESCRIPTION

Figure 1:
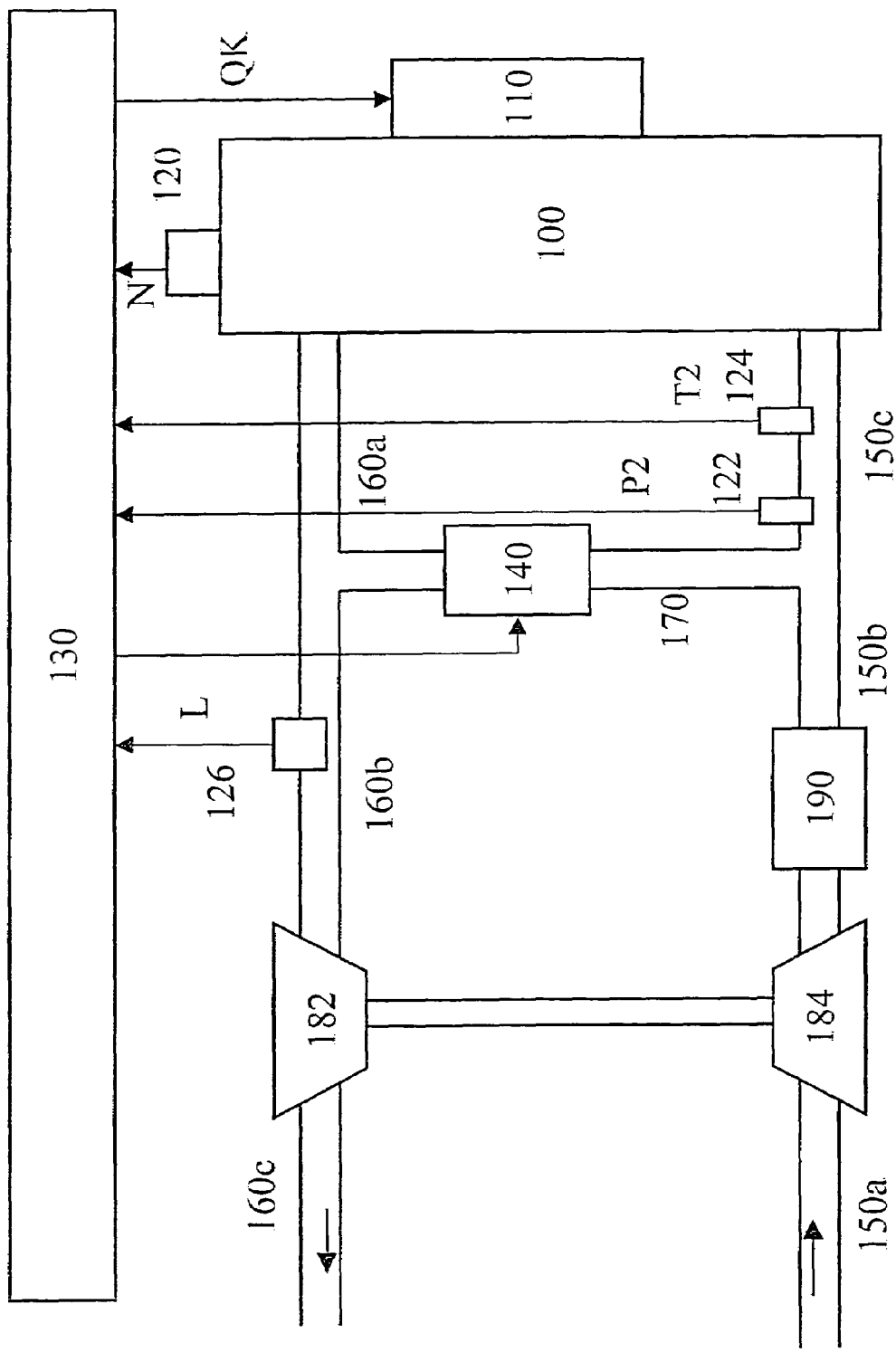
FIG. 1 shows a block diagram of the overall system.

FIG. 1 shows the device for controlling an internal combustion engine 100. A fuel-metering unit 110 is assigned to the internal combustion engine. In addition, sensors 120 are present, which detect operating parameters such as the rotational speed of the internal combustion engine. The output variables of the sensors reach a control unit 130, which in turn applies control signals to fuel-metering unit 110, which determine, for example, the injected fuel quantity QK.

Fresh air enters the internal combustion engine via a fresh-air line 150, and the exhaust gases of the internal combustion engine are carried off via an exhaust line 160. Exhaust line 160 and fresh-air line 150 are connected by way of an exhaust-return line 170. The portion of the recirculated exhaust gas, and thus the fresh-air quantity conducted to the internal combustion engine, may be controlled via an exhaust-return actuating unit 140 disposed in the region of the exhaust-return line.

Also arranged in the exhaust line is a turbine 182 of a turbocharger, which drives a compressor 184 via a shaft 186, the compressor being arranged in the fresh-air line. The region downstream from the turbine is also denoted by 160c, the region between the turbine and the branching point of exhaust-return line 170 by 160b, and the region between the internal combustion engine and the branching point is denoted by 160a.

Furthermore, the region of the fresh-air line in front of the compressor is designated 150a and the region behind the compressor 150b. Cooling devices 190, which cool the gases, may be arranged in the fresh-air line, in particular downstream from the compressor, in line element 150b or 150c and in exhaust-return line 170. Arranged in exhaust line 160, preferably in region 160b and/or 160c, is a sensor 126, which provides a signal that characterizes the oxygen concentration in the exhaust gas.

Sensors 122 and 124, which detect signals regarding pressure P2 and temperature T2 of the air conducted to the internal combustion engine, are arranged in fresh-air line 150c.

In especially advantageous embodiments, additional temperature and pressure sensors may be provided, which detect other pressure variables in the region of the exhaust line and/or the fresh-air line and the exhaust-return line.

According to the present invention, compressor 184 compresses the air that is to be conducted to the internal combustion engine and this air enters the internal combustion engine via the fresh-air line. The exhaust gases of the internal combustion engine flow through the exhaust line and turbine 182 and then enter the ambient environment.

Turbine 182 drives the compressor via a shaft 186. A portion of the exhaust gases may be introduced to the fresh air in the fresh-air line by way of the exhaust-return actuating unit.

Exhaust-return actuating unit 140 is preferably embodied as a valve in exhaust-return line 170. Alternatively and/or in addition, a throttle valve may be provided in the fresh-air line as well, especially in section 150b.

Control unit 130 triggers fuel-metering unit 110 via signal QK. Furthermore, control unit 130 also triggers exhaust-return actuating unit 140 in order to set the exhaust-recirculation rate. In particularly advantageous embodiments, additional actuating elements may be provided so as to control additional variables.

According to the present invention it is provided that the oxygen quantity in the exhaust gas is adjusted to a predefined value, which allows a substantial reduction in the exhaust-gas emission. An essential variable that influences the oxygen quantity is the rate of the recirculated exhaust gas. The rate of the recirculated exhaust gas should be adjusted such that the engine is supplied with only the oxygen quantity it needs for emission-optimized combustion. To this end, a regulated exhaust-gas recirculation must be implemented. An air-flow sensor is required for the regulation. This air-flow sensor is very complex, cost-intensive and often imprecise due to the large air quantities. The same applies to a sensor that detects the recirculated exhaust-gas quantity. It is particularly simple if the regulation of the exhaust-gas recirculation is implemented via the oxygen concentration in the exhaust gas.

According to the present invention, it is provided that in certain operating points, which are preferably defined by the rotational speed and/or the injection quantity, . . . at closed exhaust recirculation line, i.e., no exhaust recirculation takes place, . . . the measured lambda-probe signal LM is compared to reference values LR from a characteristics map. The values from the characteristics map have been determined in a reference engine, the so-called golden engine. A so-called learning value is determined in this comparison. The measured lambda signal LM is adapted by this learning value LK and thus adjusted to the values of the reference characteristics map.

In a first embodiment, a differential value LD is formed on the basis of the characteristics-map value that characterizes the oxygen mass in a closed exhaust-recirculation line, and the adapted lambda value LA in an open throttle valve. This differential value LD is subsequently compared to a setpoint value and supplied to a controller.

In a second embodiment, the adapted lambda value LA is directly regulated to a setpoint value. This setpoint value has likewise been determined for the golden engine.

In an especially preferred embodiment, it is provided that the output signal of the characteristics map and/or the measured value LM of the lambda probe are/is corrected with respect to various operating parameters, such as preferably the pressure and the temperature of the air. This is done against the background that the lambda signal is a function of pressure and temperature. Various environmental conditions, such as driving at high altitude, are taken into consideration by correcting the characteristics map, in particular.

The exhaust return line must be closed to determine learning value LK. In one embodiment, this occurs actively, i.e., the exhaust return line is actively closed when certain operating conditions, in particular steady-state operating conditions, are detected. In another embodiment, it is provided that the adaptation is implemented in normal operation, when the exhaust recirculation is closed, for example in full-load acceleration. In this case, a dynamic correction of the lambda-probe signal is advantageous.

The exemplary embodiment shown uses a quotient as learning value LK. As an alternative to a quotient, a difference or some other mathematical linkage may be selected as well, for example values for a level or a characteristics map.

The comparison between actual value and setpoint value may be implemented using the difference between closed and open exhaust-gas recirculation, or absolute values for the lambda-probe signal.

The actuator for the exhaust-gas recirculation may be a throttle valve, an exhaust-return regulating valve and/or a supercharger and/or a combination of these components. Furthermore, the control may be supplemented by different components, such as a precontrol.

Figure 2:
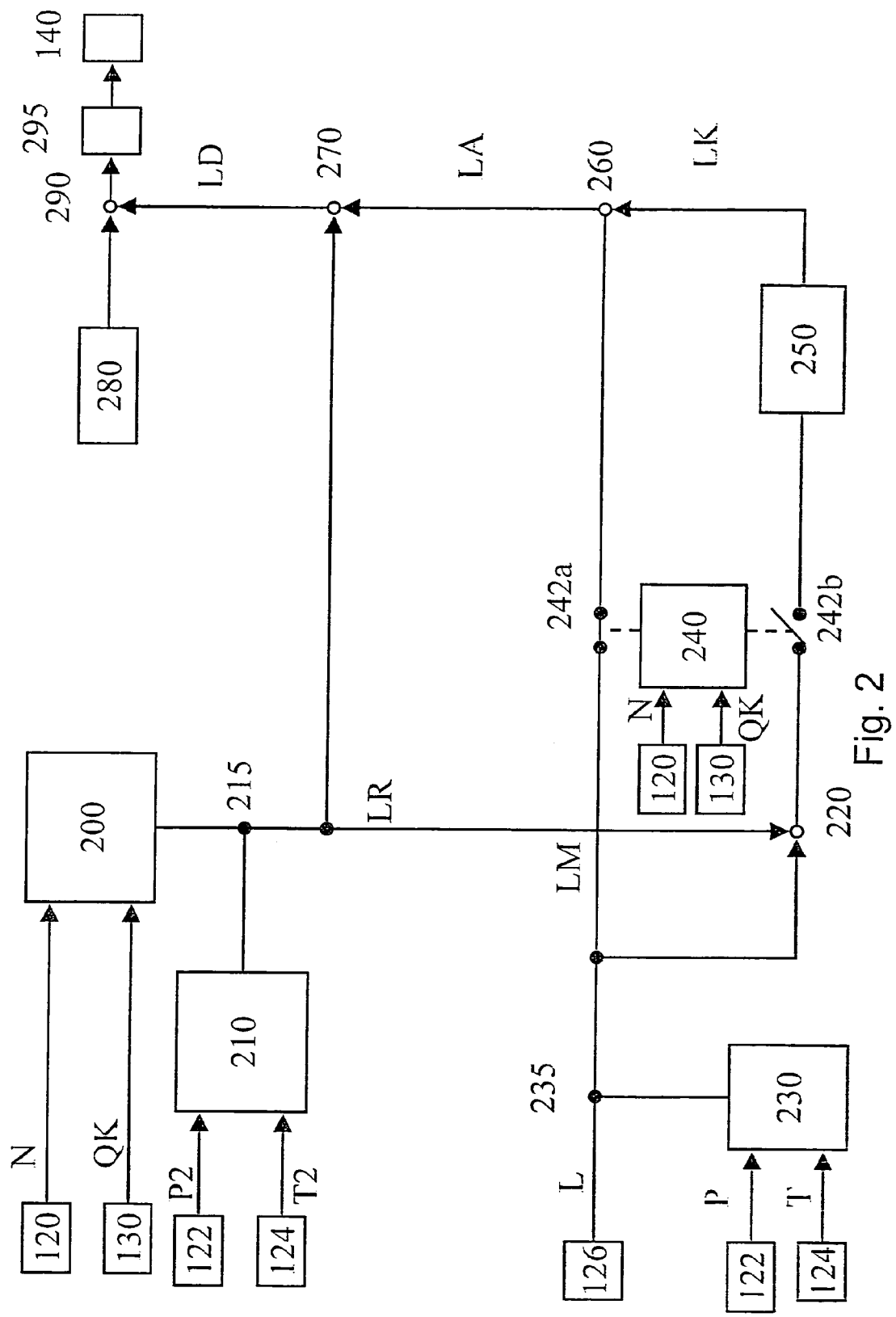
FIG. 2 shows a first embodiment of the procedure according to the present invention.

FIG. 2 shows a first specific embodiment of the procedure according to the present invention. Elements that have already been described in FIG. 1 are denoted by matching reference symbols.

The signals regarding the rotational speed and injected fuel QK, which are provided by sensor 120 or are present internally in control unit 130, are supplied to an oxygen-concentration characteristics map 200. Output signal LR of characteristics map 200 reaches a node 220 and a node 270 via a node 215. Present at the second input of node 215 is the output signal of a first pressure-temperature compensation 210. The output signal of a node 235 is available at the second input of node 220. Present at a first input of node 235 is output signal L of sensor 126, which provides a signal that characterizes the oxygen concentration in the exhaust gas. Present at the second input of node 235 is the output signal of a second pressure-temperature compensation 230. Signals P2 and T2 from sensors 122 and 124, respectively, which provide pressure and temperature values, are applied to first and also second pressure-temperature compensation 230.

Output signal L of node 235 also reaches a node 260 via a first switching means 242a. The output signal of node 220 likewise reaches node 260 by way of a switching means 242b and a filter 250. Switching means 242a and 242b are controlled by a logic 240 to which signals are provided regarding the rotational speed and/or the fuel quantity. Output signal LA of node 260 reaches the second input of node 270. Output signal LD of node 270 arrives at a node 290 at whose second input the output signal of a setpoint selection 280 is present. The same variables as those that have been provided to oxygen-concentration characteristics map 200 are preferably supplied to the setpoint selection. The output signal of the node is applied to a controller 295, which in turn acts upon various actuating elements to influence the oxygen concentration in the exhaust gas, this preferably being exhaust-recirculation actuator 140.

Stored in oxygen-concentration characteristics map 200 is a reference value LR for the oxygen concentration in the exhaust gas. This value indicates the oxygen concentration in the exhaust gas of an internal combustion engine under certain operating conditions, which are characterized by the rotational speed and the injected fuel quantity in the exemplary embodiment. In the specific embodiment shown, these are operating states in which no recirculation of exhaust gas from the exhaust line into the fresh-air line takes place. Instead of the rotational speed and/or the fuel quantity, other quantities characterizing these variables and additional quantities may be considered as well. The reference value preferably indicates the oxygen concentration in the exhaust gas for a reference engine.

Measured value LM of the oxygen concentration in node 220 is compared to this reference value. Reference value LR results only when no exhaust-gas recirculation takes place. It is provided that the comparison to measured value LM for the oxygen concentration is implemented only when no exhaust-gas recirculation occurs. This is taken into account by switching means 242 being correspondingly controlled via logic 240. In operating states in which exhaust-gas recirculation takes place, measured oxygen concentration LM is therefore compared to reference value LR. This comparison result is filtered. Using a low pass filter 250, an average value is preferably formed and a correction value LK is generated on the basis of this value. This correction value LK indicates the deviation of the measured value for the oxygen concentration from the expected value that would result in the reference engine. This correction value LK is detected in operating states in which no exhaust-gas recirculation occurs and is used in all operating states to correct measured value LM. For this purpose, switching means 242a is closed and switching means 242 is opened in operating states in which the value is not learned, i.e., in operating states with exhaust-gas recirculation.

In node 260, measured value LM is corrected by correction value LK. In the specific embodiment shown in FIG. 2, a coefficient is formed by which the measured value is multiplied. Adapted value LA for the oxygen concentration is available at the output of node 260. This value LA indicates the oxygen concentration in the exhaust gas, normalized to the reference engine, in all operating states, that is, also those operating states that include exhaust-gas recirculation. In node 270, this value is compared to the value of oxygen concentration LR of the reference engine without exhaust-gas recirculation. This signal LD is then compared to a setpoint value in node 290 and supplied to controller 295. This means that the setpoint value for the difference between the oxygen concentration with and without exhaust-gas recirculation is stored in setpoint selection 280. The actual difference between the oxygen concentration with exhaust-gas recirculation and the oxygen concentration without exhaust-gas recirculation is then adjusted to this setpoint value.

FIG. 3 shows a further, especially advantageous specific embodiment. Corresponding blocks are denoted by matching reference numerals. The specific embodiment of FIG. 3 differs from the embodiment of FIG. 2 essentially in that it is not regulated to the difference between the oxygen concentration with or without exhaust-gas recirculation, but that it is regulated to the adapted oxygen concentration LA. This means that the setpoint value for the lambda concentration without exhaust-gas recirculation for the reference engine is stored in setpoint selection 280.

Both embodiments have in common that the output signal of the sensor is normalized to a value that would result in a reference engine. This normalized signal or a quantity calculated on the basis of this normalized signal is then used as actual value for a regulation. It is especially advantageous here that characteristics map 280 for the setpoint value of the regulation need not be adjusted to the particular internal combustion engine. The same characteristics-map values may be used for all internal combustion engines, thereby markedly reducing the complexity within the framework of the application. The deviations of the particular internal combustion engine from the reference internal combustion engine are compensated by the learned value.

Of particular importance are furthermore the implementations in the form of a computer program having program-code means, and in the form of a computer program product having program-code means. The computer program of the present invention has program-code means for carrying out all the steps of the method according to the invention when the program is executed on a computer, particularly a control unit for an internal combustion engine of a motor vehicle. Thus, in this case, the present invention is realized by a program stored in the control unit, so that this control unit provided with the program constitutes the present invention in the same manner as the method for whose execution the program is suitable. The computer program product of the present invention has program-code means, which are stored on a machine-readable data carrier in order to carry out the method of the present invention when the program product is executed on a computer, particularly a control unit for an internal combustion engine of a motor vehicle. Thus, in this case the invention is realized by a data carrier, so that the method of the present invention may be carried out when the program product, i.e. the data carrier, is integrated into a control unit for an internal combustion engine, particularly of a motor vehicle. In particular, an electrical storage ROM or also an electrical permanent storage carrier, i.e. as computer program product.

What is claimed is:

1. A method for controlling an internal combustion engine, comprising:

performing a comparison of a reference value stored in a characteristics map with measured test value for a variable corresponding to an oxygen concentration in an exhaust gas of the internal combustion engine, wherein the measured test value for the variable corresponds to a selected operating state of the internal combustion engine;

determining a correction value for the variable corresponding to the oxygen concentration, on the basis of a deviation between the measured test value and the reference value; and controlling an actuating element to influence at least one of a fuel quantity conducted to the internal combustion engine and an oxygen quantity supplied to the internal combustion engine, wherein the controlling is performed based on a measured actual value for the variable corresponding to the oxygen concentration and the correction value.

2. The method as recited in claim 1, wherein:
the selected operating state is defined by at least a rotational speed and an injection quantity.

3. The method as recited in claim 1, wherein:
no recirculation of an exhaust gas takes place in the selected operating state.

4. The method as recited in claim 1, wherein:
the measured actual value of the variable is determined via a sensor arranged in at least one of an exhaust line and a fresh-air line downstream from a mouth of an exhaust-return line.

5. The method as recited in claim 1, further comprising:
controlling at least one of the reference value and the measured actual value as a function of at least one of at least one temperature variable and a pressure variable.

6. A device for controlling an internal combustion engine, comprising:
an arrangement for performing a comparison of a reference value stored in a characteristics map with measured test value for a variable corresponding to an oxygen concentration in an exhaust gas of the internal combustion engine, wherein the measured test value for the variable corresponds to a selected operating state of the internal combustion engine;
an arrangement for determining a correction value for the variable corresponding to the oxygen concentration, on the basis of a deviation between the measured test value and the reference value; and
an arrangement for controlling an actuating element to influence at least one of a fuel quantity conducted to the internal combustion engine and an oxygen quantity supplied to the internal combustion engine, wherein the controlling is performed based on a measured actual value for the variable corresponding to the oxygen concentration and the correction value.

7. A memory storing a computer program that when executed results in a performance of the following:
performing a comparison of a reference value stored in a characteristics map with measured test value for a variable corresponding to an oxygen concentration in an exhaust gas of the internal combustion engine, wherein the measured test value for the variable corresponds to a selected operating state of the internal combustion engine;
determining a correction value for the variable corresponding to the oxygen concentration, on the basis of a deviation between the measured test value and the reference value; and
controlling an actuating element to influence at least one of a fuel quantity conducted to the internal combustion engine and an oxygen quantity supplied to the internal combustion engine, wherein the controlling is performed based on a measured actual value for the variable corresponding to the oxygen concentration and the correction value.

8. The memory as recited in claim 7, wherein:
the computer program is executed on a control unit for the internal combustion engine.

* * * * *